United States Patent
Ben-Yehoshua et al.

(10) Patent No.: US 11,303,138 B2
(45) Date of Patent: Apr. 12, 2022

(54) BATTERY CASE POWER SYSTEM

(71) Applicant: Apple Inc., Cupertino, CA (US)

(72) Inventors: Lior Ben-Yehoshua, San Jose, CA (US); Brian R. Luc, Milpitas, CA (US); Glenn D. Henshaw, Sunnyvale, CA (US); Michael B. Vaughn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 16/443,678

(22) Filed: Jun. 17, 2019

(65) Prior Publication Data

US 2020/0195023 A1 Jun. 18, 2020

Related U.S. Application Data

(60) Provisional application No. 62/780,827, filed on Dec. 17, 2018.

(51) Int. Cl.

| | |
|---|---|
| H02J 7/00 | (2006.01) |
| H02J 50/40 | (2016.01) |
| H02J 7/02 | (2016.01) |
| H04M 3/42 | (2006.01) |
| H04M 1/27 | (2006.01) |
| H02J 50/80 | (2016.01) |
| H01M 50/10 | (2021.01) |

(52) U.S. Cl.
CPC ........... *H02J 7/0027* (2013.01); *H01M 50/10* (2021.01); *H02J 7/0047* (2013.01); *H02J 7/027* (2013.01); *H02J 50/40* (2016.02); *H02J 50/80* (2016.02); *H04M 1/271* (2013.01); *H04M 3/42204* (2013.01); *H04M 2250/74* (2013.01)

(58) Field of Classification Search
CPC ..................................................... H02J 7/025
USPC ......................................................... 320/108
See application file for complete search history.

(56) References Cited

U.S. PATENT DOCUMENTS

| | | | |
|---|---|---|---|
| 8,917,506 B2 | 12/2014 | Diebel et al. | |
| 9,647,474 B2 | 5/2017 | Fathollahi et al. | |
| 10,084,328 B2 | 9/2018 | You et al. | |
| 10,164,468 B2 | 12/2018 | Fitzgerald et al. | |
| 10,277,731 B2 | 4/2019 | Diebel | |
| 2009/0295230 A1* | 12/2009 | Rousu | H02J 7/0068 307/80 |
| 2010/0134305 A1 | 6/2010 | Lu et al. | |
| 2012/0177967 A1 | 7/2012 | Wang | |
| 2015/0054454 A1* | 2/2015 | White, II | H04B 5/0075 320/108 |

(Continued)

Primary Examiner — Edward Tso
Assistant Examiner — Ahmed H Omar
(74) Attorney, Agent, or Firm — Treyz Law Group, P.C.; G. Victor Treyz; Jason Tsai

(57) ABSTRACT

A battery case is operable with an electronic device such as a cellular telephone. The battery case has a battery that can be used to supply power to the electronic device. The battery case is configured to receive power from a power supply that is coupled to a mains power supply using a wired path or to receive power from a wireless charging mat or other wireless power transmitting device. Circuitry in the battery case may include direct-current-to-direct-current power converter circuitry, current sensor circuitry, switching circuitry, and other circuitry for controlling currents and voltages in the battery case and communicating with other electronic devices.

20 Claims, 6 Drawing Sheets

(56) References Cited

U.S. PATENT DOCUMENTS

| | | | |
|---|---|---|---|
| 2016/0064979 A1* | 3/2016 | Huang | H02J 7/0029 |
| | | | 320/114 |
| 2016/0099607 A1* | 4/2016 | Landis | H02J 3/30 |
| | | | 307/46 |
| 2017/0099047 A1* | 4/2017 | Hsiao | H02M 3/285 |
| 2018/0062417 A1* | 3/2018 | Choi | H02J 7/0044 |
| 2018/0062419 A1* | 3/2018 | Park | H02J 7/025 |
| 2018/0090984 A1* | 3/2018 | Ku | H02J 1/10 |
| 2019/0133303 A1 | 5/2019 | Thiel et al. | |

* cited by examiner

BATTERY CASE POWER SYSTEM

This application claims the benefit of provisional patent application No. 62/780,827, filed Dec. 17, 2018, which is hereby incorporated by reference herein in its entirety.

FIELD

This relates generally to power systems, and, more particularly, to power systems with battery cases.

BACKGROUND

Electronic devices such as cellular telephones have batteries. The use of batteries allows cellular telephones to be portable. In some situations, the battery capacity of a cellular telephone battery may be supplemented using a removable battery case. When the removable battery case is not coupled to the cellular telephone, the cellular telephone can use the battery in the cellular telephone for power. When the removable case is coupled to the cellular telephone, power may be provided to the cellular telephone using the battery in the removable case and/or the cellular telephone battery.

If care is not taken, systems with battery cases may not handle power as efficiently as possible or may not satisfy a user's expectations during use.

SUMMARY

A battery case is operable with an electronic device such as a cellular telephone. The battery case has a battery that can be used to supply power to the electronic device. The battery case may receive power from a power supply using a wired connection or may receive power wirelessly from a wireless charging mat or other wireless power transmitting device. Circuitry in the battery case includes direct-current-to-direct-current power converter circuitry, current sensor circuitry, switching circuitry, and other circuitry for charging the battery in the battery case and otherwise controlling currents and voltages in the battery case.

The circuitry may be configured to step up an input voltage to ensure that the electronic device receives sufficient voltage from the case, may be configured to use the battery to maintain a desired level of power delivery from the case in the event that the case is plugged into a low capacity power supply during operation, may be configured to directly supply an elevated battery voltage from a set of series-connected battery cells to the electronic device, may be configured to reorder a sequence (e.g., a list) of power data objects, may be configured to receive power data objects from a power source via the electronic device, and may be configured to handle power spikes by selectively drawing on battery power during operation.

DETAILED DESCRIPTION

Figure 1:
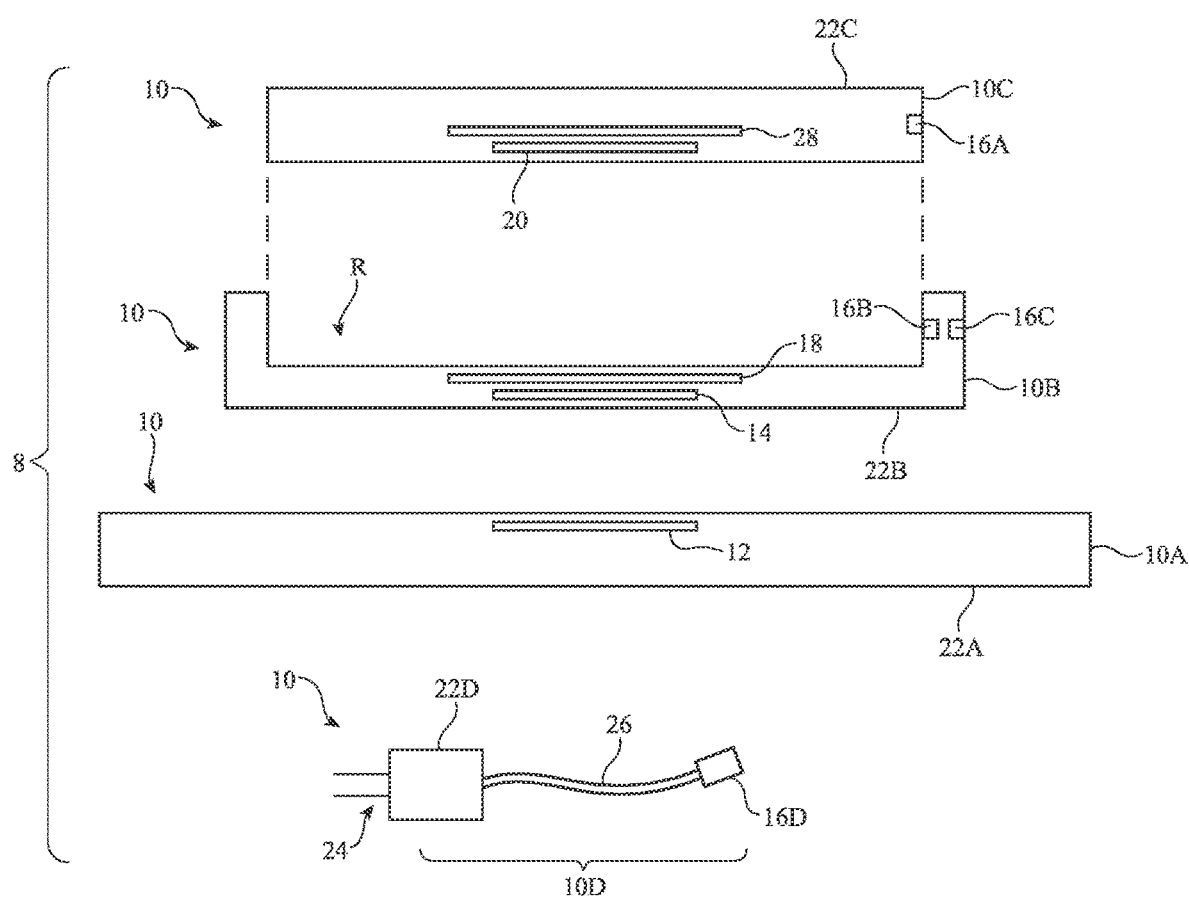
FIG. 1 is a schematic diagram of an illustrative wireless power system in accordance with an embodiment.

Electronic devices such as cellular telephones and battery cases contain batteries. Power sources such as wireless charging mats and wired power supplies are used in charging the batteries. An exploded side view of an illustrative system in which wired and wireless paths are used to convey power to devices such as a battery case and an associated electronic device is shown in FIG. 1. As shown in FIG. 1, system 8 includes electronic devices 10. Each electronic device 10 includes control circuitry. The electronic devices may also have additional components such as input-output devices, batteries, wireless power circuitry, and/or other circuitry.

Devices 10 may be any suitable electronic devices such as power adapters, wristwatches, cellular telephones or other handheld devices, laptop computers, tablet computers, accessories such as earbuds, electronic pencils (e.g., a stylus), or computer mice, other portable electronic devices, and/or other electronic equipment. In an illustrative configuration, which is sometimes described herein as an example, system 8 has a first electronic device 10A, a second electronic device 10B, a third electronic device 10C, and a fourth electronic device 10D. Electronic device 10A is a wireless power transmitting device such as a wireless charging mat. Device 10A has a housing such as housing 22A (e.g., a housing with a planar upper charging surface on which devices to be charged are placed). Electronic device 10D is a wired power adapter (sometimes referred to as a power brick or wired power supply). Terminals 24 of housing 22D are configured to couple with a wall outlet supplying mains power. An alternating-current (AC) to direct-current (DC) power adapter is housed within housing 22D and converts AC power that is received at terminals 24 into DC power. Cable 26 supplies the DC power to connector 16D.

Electronic device 10C is a portable electronic device such as a cellular telephone and electronic device 10B is a battery case. Device 10B has a housing such as housing 22B with a recess R and/or other structures configured to receive housing 22C of device 10C. In this way, a user may removably attach device 10C to device so that devices 10B and 10C may be used together as a portable unit. Housing 22C may have planar front and rear faces (as an example). The front face, which faces upwardly in the orientation of FIG. 1, has a display. The rear face of housing 22C faces towards housing 22B of device 10B. Device 10C has a wired connector such as connector 16A that is configured to mate with corresponding connectors such as wired connector 16B of device 10B, so that device 10B can provide wired power to device 10C. Device 10B includes connector 16C, which is configured to mate with connector 16D of device 10D so that power can be provided from device 10D to device 10B. Device 10B can receive wireless power from device 10A. In scenarios in which device 10B is not present, connectors 16D and 16A may be coupled to each other so that device 10D can supply wired power to device 10C.

To provide device 10C with supplemental power while protecting device 10C from damage due to stress-producing events such as drop events, device 10B is installed on device 10C (e.g., housing 22C of device 10C may be placed within corresponding recess R in housing 22B of device 10B to removably couple device 10B to 10C). In this position, devices 10B and 10C may be carried in the pocket of a user (as an example). Connectors 16A and 16B mate when device 10C is coupled to device 10B so that battery power can be provided from device 10B to device 10C over a wired path.

When it is desired to receive wireless power from device 10A, device 10B (and, if desired, device 10C within recess R), may be placed on the charging surface of device 10A. Device 10A may have one or more wireless power coils such as wireless power coil 12. Coils such as coil 12 are used for inductive wireless power transfer and may therefore sometimes be referred to as inductive power coils. When it is desired to transmit wireless power, an alternating current is applied to coil 12, which generates a corresponding alternating-current electromagnetic field. Wireless power that is transmitted in this way is received by corresponding nearby wireless power coils. As shown in FIG. 1, for example, device 10C may have a wireless power coil such as coil 20 that can receive wireless power directly from coil 12 in the absence of device 10B. Device 10B has wireless power coil 14 that can receive wireless power from coil 12 and has connector 16C that can receive wired power from connector 16D of device 10D.

Electrical components such as battery 18 may be mounted in housing 22B of device 10B. Electrical components such as battery 28 may be mounted in housing 22C of device 10C.

Figure 2:
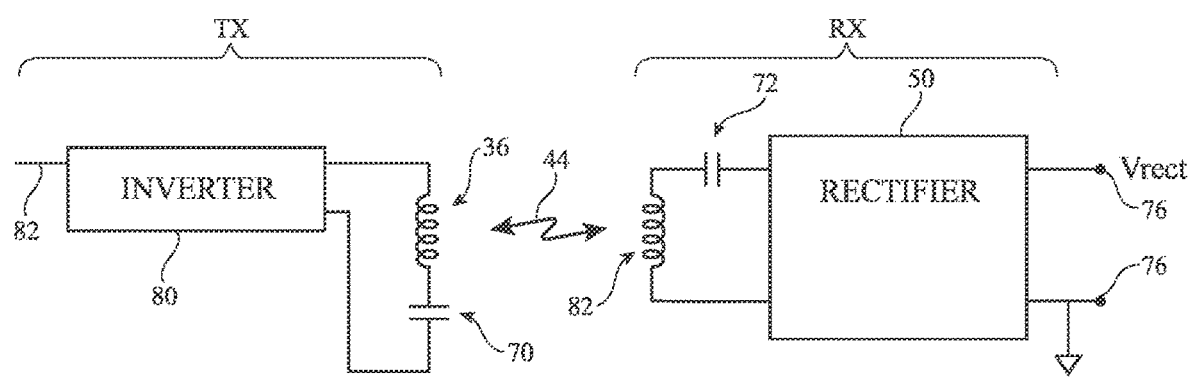
FIG. 2 is a circuit diagram of illustrative wireless power circuitry in accordance with an embodiment.

The devices 10 of FIG. 1 may transmit power and/or may receive power using wireless and/or wired paths. Illustrative wireless power circuitry of the type that may be used in devices 10 is shown in FIG. 2. The wireless power circuitry of FIG. 2 includes wireless power transmitter TX and wireless power receiver circuitry RX. During operation, wireless power signals 44 are transmitted by circuitry TX and received by circuitry RX. In the embodiment of FIG. 2, wireless power is transferred from coil 36 to coil 82 in a single direction. If desired, additional transmitter and receiver circuitry may be provided to allow wireless power to be transferred bidirectionally (e.g., to allow a first transmitter circuit to transmit power from coil 36 to coil 82 for reception by a first receiver circuit and to also allow a second transmitter circuit to transmit power from coil 82 to coil 36 for reception by a second receiver circuit). The unidirectional power transmission circuitry of FIG. 2 is illustrative.

As shown in FIG. 2, circuitry TX includes inverter circuitry 80. Control circuitry supplies control signals to inverter circuitry 80. Inverter circuitry 80 supplies corresponding alternating-current drive signals to coil 36. Circuit components such as capacitor 70 may be coupled in series with coil 36 as shown in FIG. 2. When alternating-current current signals are supplied to coil 36, corresponding alternating-current electromagnetic signals (wireless power signals 44) are transmitted to nearby coils such as illustrative coil 82 in receiver circuitry RX. This induces a corresponding alternating-current (AC) current signal in coil 82. Capacitors such as capacitors 72 may be coupled in series with coil 82. Rectifier 50 receives the AC current from coil 82 and produces corresponding direct-current power (e.g., direct-current voltage Vrect) at output terminals 76. This power may be used to power a load.

In a bidirectional wireless power system, wireless power transmitting circuitry such as inverter 80 and wireless power receiving circuitry such as receiver 50 may be coupled to a common coil. This allows the same coil to be used in receive wireless power (when the wireless power receiving circuitry is active) and in transmitting wireless power (when the wireless power transmitting circuitry is active).

Figure 3:
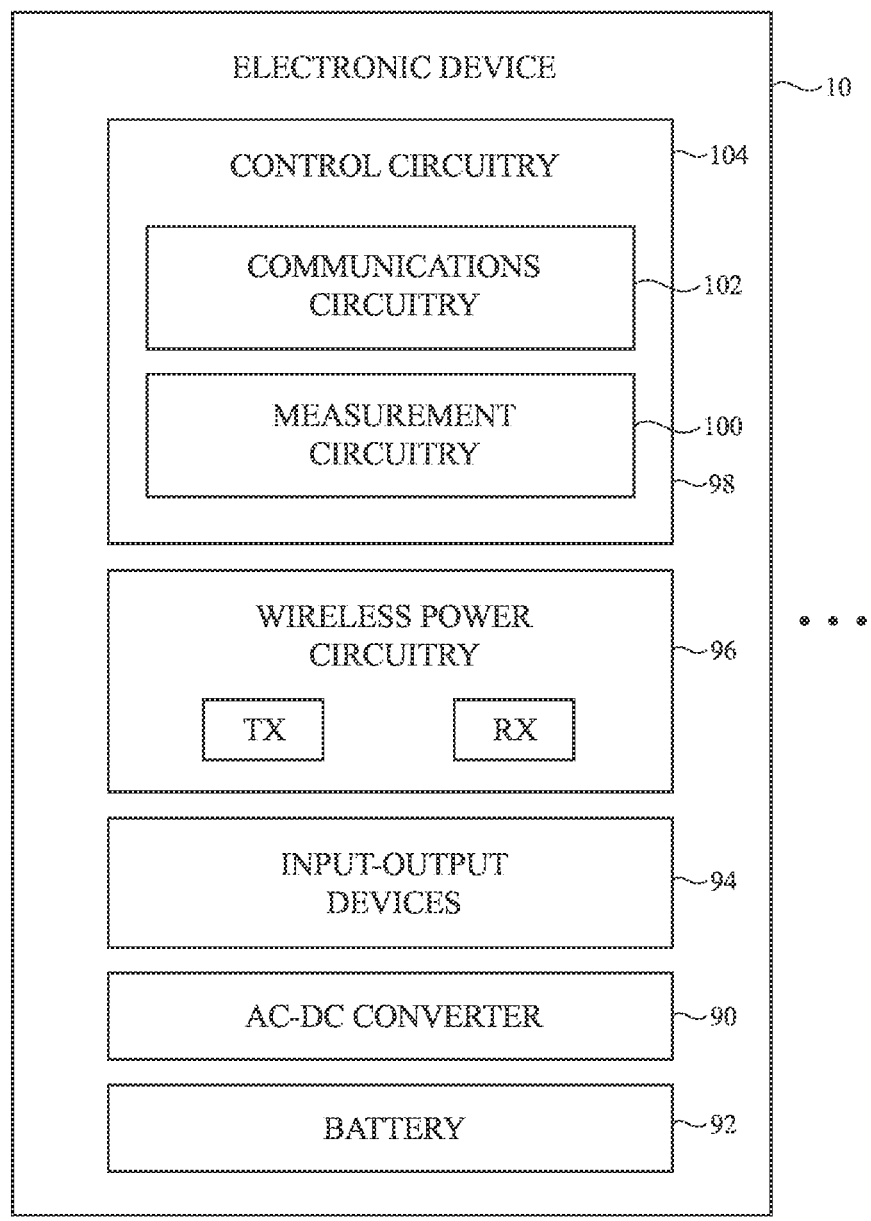
FIG. 3 is a schematic diagram of illustrative electronic device circuitry in accordance with an embodiment.

FIG. 3 is a schematic diagram showing illustrative circuitry that may be used in each device 10 in system 8. The circuitry of FIG. 3 need not all be used in a given device. For example, some of the circuitry of device 10 of FIG. 3 may be used in device 10A but not in devices 10B and 10C. Device 10A may, as an example, be a wireless charging mat that is coupled by a cable to a mains power supply (e.g., a wall outlet). In this arrangement, device 10A may use an alternating-current-to-direct-current power converter such as AC-DC converter 90 to convert alternating-current (AC) mains power to direct-current (DC) power for use by device 10A, whereas circuitry such as AC-DC converter 90 may be omitted from devices 10B and 10C. In an embodiment, device 10D is a wired power adapter and does not contain wireless power circuitry or a battery. In other embodiments, device 10D may contain a battery and/or different sets of components may be selectively omitted from each of devices 10.

One or more devices 10 in system 8 may include wireless power circuitry 96 such as wireless power transmitter circuitry TX and/or wireless power receiver circuitry RX. For example, device 10A may contain only transmitter circuitry TX and no receiver circuitry RX. Device 10C may contain only receiver circuitry RX for receiving power from device 10A and/or from device 10B or, if desired, may contain both receiver circuitry RX (for receiving power from device 10A and/or device 10B) and transmitter circuitry TX (for transmitting power to an electronic device 10 such as a pair of earbuds, an electronic stylus, or other electronic device and/or for transmitting power to device 10B). Device 10B may contain circuitry RX (e.g., to receive power from device 10A to charge a battery in device 10B and, if desired, to receive power from device 10C) and may optionally contain circuitry TX (e.g., to transmit power from the battery in device 10B to device 10C when devices 10B and 10C are coupled together and device 10C desires supplemental power from device 10B and/or to transmit power from the battery in device 10B to other electronic devices). Other configurations (e.g., configurations in which device 10A includes wireless power receiver circuitry RX, etc.) may also be used, if desired. Wireless power transmitter circuitry TX and wireless power receiver circuitry RX contain coils, as described in connection with coils 36 and 82 of FIG. 2.

Device 10A, device 10B, device 10C, and device 10D include control circuitry as shown by control circuitry 104 of device 10 of FIG. 3. Control circuitry 104 is used to control the operation of devices 10A, 10B, 10C, and 10D. This control circuitry may include processing circuitry associated with microprocessors, power management units, baseband processors, digital signal processors, microcontrollers, and/or application-specific integrated circuits with processing circuits. The processing circuitry implements desired control and communications features in devices 10A, 10B, 10C, and 10D. For example, the processing circuitry may be used in selecting coils, determining power transmission levels, processing sensor data and other data, processing user input, handling negotiations between devices (e.g., to establish power transfer settings), sending and receiving in-band and out-of-band data, making measurements, and otherwise controlling the operation of system 8.

Control circuitry in system 8 such as control circuitry 104 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 104. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 104. The processing circuitry may include application-specific integrated circuits with processing circuitry, one or more microprocessors, a central processing unit (CPU) or other processing circuitry.

Electronic devices 10A, 10B, 10C, and 10D may include input-output circuitry as shown by input-output devices 94 of FIG. 3. Input-output devices 94 may include light-based devices (e.g., displays, status indicator lights formed from light-emitting diodes or other light emitters, ambient light sensors, image sensors, optical proximity sensors, three-dimensional image sensors formed from light emitters that project beams of light and corresponding image sensors that detect dots where the projected light beams strike objects, camera flash components, and/or other circuits that emit and/or detect light), radio-frequency circuitry (e.g., radio-frequency circuitry such as radar circuitry and/or other radio-frequency circuitry for detecting the location and movement of objects), acoustic components (e.g., microphones for gathering sound and speakers for emitting sound), haptic output devices for providing vibrations and other haptic output, touch sensors, buttons, force sensors, joysticks, knobs, temperature sensors, gas sensors, and/or other circuitry for detecting user input and for measuring environmental data.

Electronic devices 10A, 10B, 10C, and 10D may be any suitable electronic devices. For example, device 10A may be a stand-alone wireless power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which device 10A is a wireless power transmitting device such as a wireless charging mat are sometimes described herein as an example. Electronic device 10D may be a wired power adapter (e.g., a power brick) that plugs into mains power or a wired power adapter that supplies power from a battery. Electronic device 10B may be a supplemental battery pack. For example, device 10B may be a battery case that includes a battery such as battery 92 to provide supplemental battery power to electronic devices such as device 10C and/or other electronic devices. Illustrative configurations in which device 10B is a battery case (sometimes referred to as a supplemental enclosure, removable case, or removable battery case) are sometimes described herein as an example. Electronic device 10C may be a cellular telephone or other portable electronic device (e.g., a tablet computer, laptop computer, wristwatch device, headphones, earbuds, stylus, or other electronic device). Illustrative configurations in which device 10C is a cellular telephone are sometimes described herein as an example.

Devices 10A, 10B, 10C, and/or 10D may include wireless communications circuitry such as communications circuitry 102 of device 10 of FIG. 3. The wireless communications circuitry may be used by devices 10A, 10B, 10C, and/or 10D to allow these devices (or a subset of these devices) to communicate wirelessly using in-band or out-of-band communications. Circuitry 102 may, for example, have wireless transceiver circuitry (e.g., a wireless transmitter) that wirelessly transmits out-of-band signals to an external device using an antenna. Circuitry 102 may also have wireless transceiver circuitry (e.g., a wireless receiver) that is used to wirelessly receive out-of-band signals from an external device using the antenna.

Wireless communications circuitry 102 can use one or more coils (e.g., coils in transmitter circuitry TX and/or receiver circuitry RX) to transmit and/or receive in-band signals. Any suitable modulation scheme may be used to support in-band communications between devices 10. With one illustrative configuration, frequency-shift keying (FSK) is used to convey in-band data from a power transmitting circuit to a power receiving circuit (e.g., the frequency of wireless power signals may be modulated when power is being transmitted from the power transmitting circuit to the power receiving circuit) and amplitude-shift keying (ASK) is used to convey in-band data from a wireless power receiving circuit to a wireless power transmitting circuit. Power transfer may be continue between devices during these FSK and ASK transmissions. Other types of in-band communications may be used, if desired.

During wireless power transmission operations, control circuitry 104 drives inverter circuitry in transmitter circuitry TX to supply AC drive signals to one or more coils at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices. In other configurations, the power transmission frequency may be fixed.

During wireless power transfer operations with a wireless power transmitting device (e.g., one of devices 10 in system 8), while power transmitter circuitry TX is driving AC signals into one or more of coils to produce wireless signals 44 at the power transmission frequency, communications circuitry 102 uses FSK modulation to modulate the power transmission frequency of the driving AC signals and thereby modulate the frequency of signals 44. In a wireless power receiving device (e.g., another of devices 10 in system 8), a coil is used to receive signals 44. Power receiver circuitry RX uses the received signals on the coil and the rectifier circuitry in circuitry RX to produce DC power. At the same time, wireless transceiver circuitry in the receiving device uses FSK demodulation to extract the transmitted in-band data from signals 44. This approach allows FSK data (e.g., FSK data packets) to be transmitted in-band between devices 10 with coils while power is simultaneously being wirelessly conveyed from between devices 10 using the coils.

The foregoing discussion of FSK and ASK technologies describes a data transmission mechanism between compatible power transmitters and receivers. It is desirable for power transmitter and receiver circuitry to be able to communicate information such as received power, frequency information, states of charge, so forth, to control wireless power transfer. However, the above-described technology need not involve the transmission of personally identifiable information using FSK or ASK in order to function. Out of an abundance of caution, it is noted that to the extent that implementations of this charging technology involves the use of personally identifiable information, implementers should follow privacy policies and practices that are generally recognized as meeting or exceeding industry or governmental requirements for maintaining the privacy of users.

In particular, personally identifiable information data should be managed and handled so as to minimize risks of unintentional or unauthorized access or use, and the nature of authorized use should be clearly indicated to users.

If desired, control circuitry 104 of devices 10 (e.g., device 10 of FIG. 3) may have external object measurement circuitry 100 (sometimes referred to as foreign object detection circuitry or external object detection circuitry) that detects external objects on a charging surface or other wireless power output region associated with device 10. Circuitry 100 can detect foreign objects such as coils, paper clips, and other metallic objects and can detect the presence of a wireless power receiving device in the vicinity of wireless power transmitting circuitry. During object detection and characterization operations, external object measurement circuitry 100 can be used to make measurements on coils in device 10 to determine whether any external electronic devices are present on or near device 10 (e.g., touching a surface of the housing of device 10).

In an illustrative arrangement, measurement circuitry 100 of control circuitry 104 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). The characteristics of the coil that receives a signal from measurement circuitry 100 depend on whether any foreign objects overlap that coil (e.g., coins, wireless power receiving devices, etc.) and also depend on whether a wireless power receiving device with a coil is present, which could increase the measured inductance of a coil. Signal measurement circuitry 100 is configured to apply signals to the coil and measure corresponding signal responses. For example, signal measurement circuitry 100 may apply an alternating-current probe signal while monitoring a resulting signal at a node coupled to the coil. As another example, signal measurement circuitry 100 may apply a pulse to the coil and measure a resulting impulse response (e.g., to measure coil inductance). Using measurements from measurement circuitry 100, device 10 can determine whether an external object is present on the coil(s) of device 10.

If desired, measurement circuitry 100 and/or other circuitry in device 10 of FIG. 3 may be omitted from one or more of devices 10 to help reduce the cost and complexity of that device. For example, device 10A may have a battery to help store energy or battery 92 may be omitted from device 10A to reduce cost (e.g., in an embodiment in which device 10A has AC-DC power converter 90 to receive mains power). Converter 90 may, if desired, be omitted from devices 10B and 10C to conserve space and reduce cost and complexity for those devices. In an embodiment, measurement circuitry 100 is included in device 10A and is omitted from devices 10B, 10C, and 10D. In an embodiment in which device 10C has wireless power transmitter circuitry TX, device 10C may include measurement circuitry 100. In an embodiment in which device 10C does not include wireless power transmitter circuitry TX, device 10C need not include measurement circuitry 100 (as an example).

Communications circuitry 102 may likewise be incorporated and/or omitted from one or more of devices 10. In some embodiments, a given one of devices 10 includes only transmitter circuitry TX or only receiver circuitry RX. If desired, one or more of devices 10A, 10B, and/or 10C may include transmitter circuitry TX and receiver circuitry RX.

Figure 4:
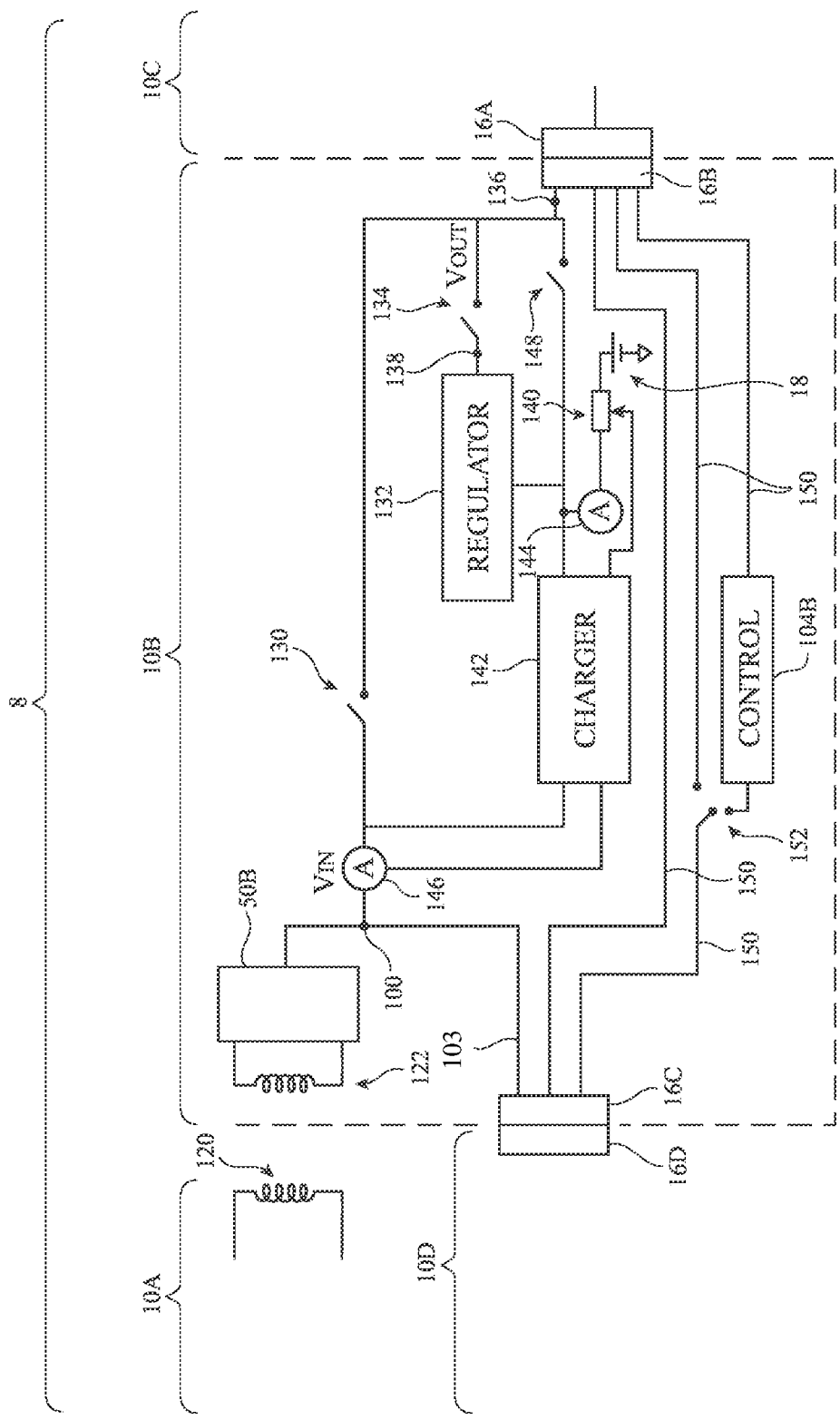
FIG. 4 is a circuit diagram of an illustrative wireless power system in accordance with an embodiment.

FIG. 4 is a circuit diagram showing how devices 10A, 10B, 10C, and 10D may be used together in system 8. FIG. 4 shows how devices 10A and 10B may be electromagnetically coupled (e.g., coil 120 of device 10A may be electromagnetically coupled with coil 122 of device 10B). This allows wireless power to be supplied to device 10B from device 10A. The wireless power signals that are received with coil 122 are rectified by rectifier 50B and provided as direct-current (DC) power at node 100. If desired, devices 10D and 10B may be coupled using a wired path (e.g., using connectors 16D and 16C). In this type of scenario, wired power (e.g., DC power from an AC-DC converter in device 10D) is supplied to node 100 via path 103.

Device 10B includes circuitry such as switches, power converter circuitry, battery charging circuits, processing circuitry, connectors, current sensors, and/or other circuitry for operating device 10B and system 8. The circuit arrangement shown in the diagram of FIG. 4 is illustrative.

As shown in the illustrative configuration of FIG. 4, control circuitry 104B can close a switch such as switch 130 when it is desired to route voltage Vin at node 100 to regulator 132. Regulator 132 is a direct-current-to-direct-current (DC-to-DC) power converter that converts the input voltage received via switch 130 to a desired output voltage on node 138 by circuitry in device 10C. The voltage on node 138 and/or other power supply voltages in device 10B may be used to power the circuitry of device 10B. Control circuitry 104B can close switch 134 when it is desired to route power (e.g., output voltage Vout) from regulator 132 to node 136. Control circuitry 104B can close switch 140 when it is desired to route power from battery 18 to device 10C.

Device 10C of FIG. 4 is coupled via a wired connection to device 10B using connector 16B of device 10B and mating connector 16A of device 10C. Device 10C uses power from node 136 in powering the circuitry of device 10C (e.g., to operate control circuitry, to operate communications circuitry, to operate components such as a display, to charge the battery of device 10C, etc.).

When it is desired to charge battery 18, control circuitry 104B closes switch 140 and charges battery 18 using charging circuitry 142. Battery 18 may be a lithium battery or other suitable battery and may have any suitable number of cells in parallel and/or serial configurations. In an embodiment, battery 18 is a lithium battery with two cells in series (a 2s configuration). During charging, charging circuitry 142 supplies a charging voltage to battery 142 through switch 140 while current sensor 144 monitors charging current. Control circuitry 104B can use switch 140 (e.g., a field-effect transistor) to control the amount of current flowing into battery 18 during charging, thereby preventing excessive charging currents.

When it is desired to power device 10C from battery power, switch 148 may be closed. In some situations, voltages in device 10B can be boosted using power regulator circuitry in device 10B. For example, battery voltage can be increased using regulator 132 (e.g., while switch 148 is open and switch 134 is closed). Current sensor 146 may be used to detect the total current flowing to charging circuit 142 and around the bypass path (i.e., the total current). The amount of current flowing into battery 140 may be determined using current sensor 144.

One or more signal lines (e.g., data lines 150) may be used in passing signals between connector 16D of device 10D and connector 16A of device 10C. These signal lines may include, for example, Universal Serial Bus data lines. The pattern of the data lines may be reconfigurable. For example, switch 152 can be configured to couple a data line from connector 16DC to control circuitry 104B or to connector 16B. Using data lines 150 and wireless communications circuitry associated with coils 120 and 122 and/or other wireless communications circuitry in devices 10, devices 10D and 10C can communicate directly or indirectly with each other and devices 10A and 10C may communicate directly or indirectly with each other. Devices 10C and 10B can also communicate directly or indirectly and devices 10A and 10B can communicate directly or indirectly. During negotiations to establish appropriate power transmission levels in system 8, for example, devices 10B and/or 10C may communicate with each other and may communicate with devices 10A and/or 10D.

When device 10A or device 10D is available to provide power to devices 10B and 10C, it may be desirable to route power to device 10C through device 10B. By providing power to device 10C in this way whenever power is available from device 10A or device 10D, the battery in device 10C is not depleted. There is a potential for voltage drops during power delivery from node 100 to node 136 e.g., as a function of the resistance of the path between nodes 100 and 136 and the current supplied, which gives rise to the possibility that the voltage at node 136 might be lower than desired (e.g., lower than 5V, even when the voltage Vin at node 100 is 5V). Accordingly, device 10B uses DC-DC power converter circuitry (e.g., converter circuitry associated with regulator 132 or a battery charging circuit, etc.) to step up voltage Vin to a higher voltage. As an example, if Vin at the input of regulator 132 is 5V, the output voltage Vout that is provided to node 136 at the output of regulator 132 can be 8V (e.g., 8V at 1.5 A rather than 5V at 2.4 A). This ensures that device 10C will receive sufficient voltage to operate properly when being powered through connector 16A.

To preserve battery charge in device 10C, device 10C attempts to run its load using voltage Vout on node 136, even in the absence of input power to device 10B from device 10A or device 10D. In this scenario, device 10B uses battery 18 to supply a given amount of power to device 10C. For example, device 10B may use battery 18 to deliver an amount of power such as 5 W of power that is sufficient for powering the operation of device 10C without using the battery of device 10C. During this mode of operation, device 10A or device 10D may become available to supply power. For example, a user may plug device 10B into device 10D to receive power. The maximum power capability of device 10D may be less than the given amount of power being delivered by battery 18. For example, device 10D may only be capable of delivering 2.5 W. To avoid creating an undesired sudden drop in the amount of power available to device 10C at node 136 in response to plugging device 10C into a device 10A that has less power available than the current amount of power being delivered from battery 18 to device 10C, device 10B automatically shifts from a first mode in which all 5W of power is supplied to device 10C from battery 18 to a second mode in which device 10D supplies as much power as possible from device 10D (2.5 W in this example) while device 10B makes up for the shortfall in power (5 W-2.5 W in this example) from battery 18. In this second mode of operation, device 10C continues to receive 5 W of power from node 136, because device 10B has ensured that 2.5 W is supplied to node 136 to make up for the shortfall in power from device 10D (or, in other scenarios, the shortfall in power from device 10A). An advantage of this arrangement is that device 10C will not suddenly revert to using its own internal battery to make up for lost power when the power delivery from device 10A or device 10D falls below the level that was being delivered alone by device 10B before device 10A or device 10D was present. This helps preserve battery charge in device 10C and allows system 8 to operate satisfactorily for the user of device 10C.

Whenever possible, device 10C will attempt to charge its internal battery using the power supplied to node 136 by device 10B. When node 136 is being supplied with power from battery 18, this power can be used in charging the battery in device 10C. Battery charging in device 10C may involve using a DC-DC power converter in device 10C to adjust the voltage Vout that is received by device 10C to a desired voltage to use internally to charge the battery in device 10C. Battery 18 is a 2$s$ lithium battery, so battery 18 can supply about 6-8.6V to node 136 directly when switch 148 is closed (without incurring losses passing through a power converter). Because this voltage is sufficient to charge the internal battery in device 10C without being stepped up to a higher voltage, power losses due to power converter step-up operations in device 10B are not incurred, thereby enhancing charging efficiency.

System 8 may support Universal Serial Bus Power Delivery (USB PD) contract negotiations. These power contract negotiations involve sending sequences (e.g., lists) of available power data objects (PDOs) between power supplies and other devices.

Figure 5:
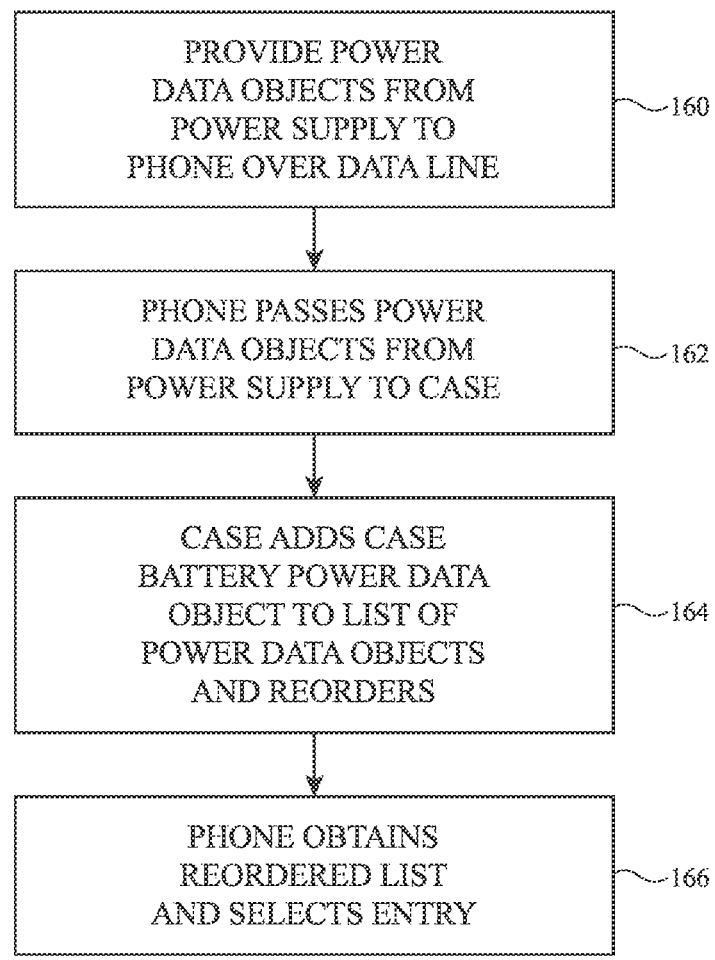
FIG. 5 is a diagram of illustrative operations involved in using a wireless power system in accordance with an embodiment.

FIG. 5 is a flow chart of illustrative operations involved in using PDOs in system 8.

During the operations of block 160, electronic devices 10 may exchange power data objects (voltage-current pairs associated with supported power delivery conditions). As an example, during contract negotiations, device 10D may supply the following PDOs: PDO1: 5V at 1 A, PDO2: 5V at 3 A, PDO3: 9V at 2.5 A, and PDO4: 15V at 2 A. These PDOs can be conveyed directly from device 10D to device 10C via data lines 150 (e.g., a data line that passes directly from a pin in connector 16C to a pin in connector 16B). When conveyed directly in this way, control circuitry 104B need not be involved in relaying the PDOs from device 10D to device 10C. The PDOs that are provided from device 10D to device 10C represent the power delivery capabilities of device 10D.

During the operations of block 162, device 10C (e.g., a cellular telephone) provides the PDOs that were received from device 10D to device 10B. Device 10B (e.g., a cellular telephone case in this example) adds an additional PDO to the sequence (list) of PDOs received from device 10D via device 10C during the operations of block 164. The additional PDO represents the power delivery capability of device 10B using battery 18. This additional PDO may be, for example, a fifth PDO such as PDO5: 5.5-8.6V at 0.8 A.

During the operations of block 164, device 10B reorders the sequence of PDOs. The PDOs may, for example, be reordered so that PDOs that are expected to be associated with more efficient system operation are placed at the beginning of the reordered PDO sequence (e.g., at the top of the reordered PDO list) and the PDOs that are expected to be associated with less efficient operation are placed at the end of the reordered PDO sequence (e.g., at the bottom of the reordered PDO list). Device 10B may consider states of charge, device capabilities, and other factors in determining how to reorder the sequence. As an example, if the battery of device 10C is fully charged, device 10B may conserve system power by placing PDO1 at the beginning of the PDO sequence (e.g., at the top of the PDO list). If, as another example, battery 18 of device 10B is depleted, device 10B may delete the battery option (PDO5) from the sequence.

After reordering the PDOs (e.g., from most efficient to least efficient), device 10B presents the reordered PDO sequence (e.g., the reordered PDO list) to device 10C and device 10C obtains and uses this PDO sequence in determining which PDO to use in receiving power from device 10D (block 166). Power delivery then proceeds using the selected PDO. In making a selection from the PDO sequence, device 10C can be configured to always select the first item in the sequence (e.g., the top entry in the list). In this way, device 10B can indirectly select the PDO for device 10C to use without requiring that device 10C understand the topology of system 8.

Figure 6:
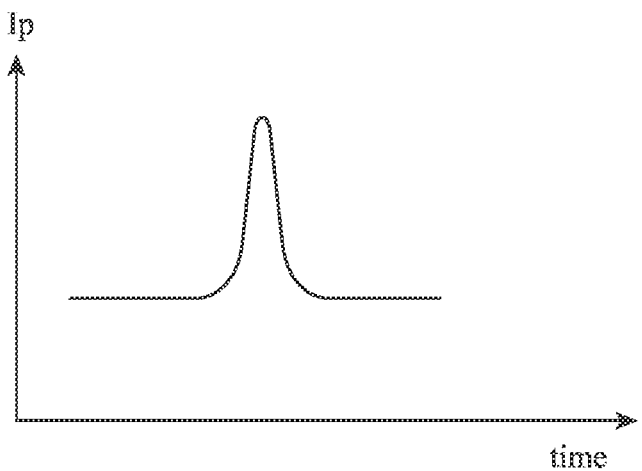
FIG. 6 is a graph showing an illustrative current drawn by an electronic device in accordance with an embodiment.

As shown in the graph of FIG. 6, the current Ip drawn by the load of device 10C may be characterized by intermittent spikes. For example, a user of device 10C may launch a voice-activated assistant or may initiate downloading of a large file over a wireless connection. Operations such as these may be associated with spikes in power consumption and corresponding current spikes. Because relatively small changes in regulated current in system 8 have the potential to lead to undesired large sags in voltage, it can be challenging to regulate power in system 8 in the presence of current spikes in device 10C. To help accommodate currents spikes without causing undesired supply voltage fluctuations, device 10B (e.g., control circuitry 104B) automatically switches battery 18 into use in response to detecting an increase in the current drawn by device 10C (e.g., a current above a threshold amount). In this way, battery 18 serves as a power buffer that can help device 10B to satisfy spikes in power demand without creating voltage sag that might otherwise occur if a spike in drawn current were to exceed the capacity of a voltage regulator circuit that is supplying power.

Figure 7:
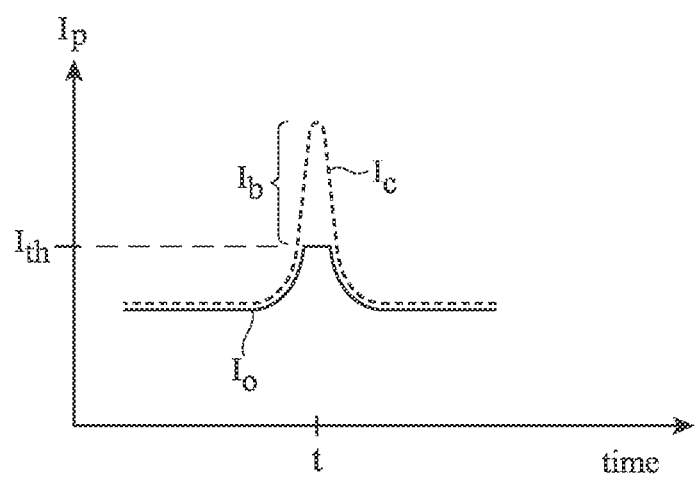
FIG. 7 is a graph showing how battery power in a battery case can be used to supply peak current when the current drawn by an attached electronic device exceeds a threshold amount in accordance with an embodiment.

Consider, as an example, the graph of FIG. 7. In the graph of FIG. 7, current Ic represents the total amount of current that is supplied by device 10B to device 10C, which exhibits a spike at time t due to a spike in the current drawn by device 10C (e.g., due to a spike in activity associated with launching a voice-controlled assistant, etc.). The total current Ic is made up of a first part that is not associated with battery 18 and a second part that is associated with battery 18. The first portion of current Ic, which is represented by current Io in the graph of FIG. 7, may be supplied by device 10A and/or device 10D and may, if desired, pass through a regulator such as regulator 132 or other power converter before being received by device 10C via terminal 136. The second portion of current Ic, which is represented by battery current portion Ib in FIG. 7, may be supplied by from battery 18 when a need for supplying current in excess of threshold current Ith is detected (e.g., using switches 140 and 148). By satisfying peak demands in current from battery 18, spikes in current Ic can be prevented from creating undesired sags in supply voltage while using device 10B (and device 10A or 10D) to supply power to device 10C.

The foregoing is merely illustrative and various modifications can be made to the described embodiments. The foregoing embodiments may be implemented individually or in any combination.

What is claimed is:

1. A battery case that is operable in a system having a first electronic device that supplies power and a second electronic device that consumes power, comprising:
    a housing that removably attaches to the second electronic device;
    a battery;
    a power converter that is configured to receive an input voltage associated with the power supplied by the first electronic device and that is configured to step up the input voltage to supply a corresponding stepped-up output voltage, via an output, to the second electronic device without supplying power to the battery; and
    a switch coupled between the power converter and the output, wherein the switch is in a first state when the stepped-up voltage is supplied to the second electronic device and is in a second state, different than the first state, when decoupling the power converter from the output.

2. The battery case of claim 1, wherein the switch is closed in the first state and is open in the second state, wherein the electronic device comprises a cellular telephone with a first connector, wherein the battery case comprises a second connector configured to mate with the first connector, and wherein the stepped-up output voltage is provided from the power converter to the second electronic device through the first and second connectors.

3. The battery case of claim 2 wherein the first electronic device comprises a wireless power transmitter, wherein the battery case comprise a coil and a rectifier configured to receive wireless power from the wireless power transmitter, and wherein the rectifier supplies the input voltage to the power converter.

4. The battery case of claim 2 wherein the first electronic device comprises a power supply configured to receive alternating-current mains power and wherein the battery case has a third connector that is configured to mate with a fourth connector in the power supply.

5. A battery case that is operable in a system having a first electronic device and a second electronic device, wherein the second electronic device is configured to draw a first amount of power in a first state and a second amount of power that is greater than the first amount of power in a second state, comprising:
    a housing that removably attaches to the second electronic device;
    circuitry having an input and an output;
    a battery, wherein the circuitry is configured to use the output to supply the first amount of power to the second electronic device from the first electronic device when the second electronic device is in the first state and wherein the circuitry is configured to use the output to supply the second amount of power to the second electronic device when the second electronic device is in the second state by supplying a portion of the second amount of power less than a threshold amount to the electronic device from the first electronic device and by supplying a difference between the threshold amount and the second amount of power from the battery;
    a current sensor configured to monitor an amount of current flowing into the battery; and
    a switch configured to control the amount of current flowing into the battery to prevent excessive charging currents.

6. The battery case of claim 5 wherein the connector is configured to mate with a corresponding connector in the first electronic device.

7. The battery case of claim 5 further comprising a coil that is configured to receive wireless power signals from the first electronic device.

8. A battery case that is operable with an electronic device, the battery case comprising:
    a housing that is removably coupled to the electronic device;
    a first connector that is removably connected to a mating second connector in the electronic device;
    power receiving circuitry;
    a battery that produces a battery voltage; and circuitry coupled between the battery and the first connector, wherein the circuitry is configured to provide power to the electronic device from the power receiving circuitry when the electronic device has a first power consumption, wherein the circuitry includes first and second switches coupled between the battery and the first connector, wherein the circuitry is configured to close the first and second switches to provide the battery voltage to the first connector when the electronic device has a second power consumption that is greater than the first power consumption, wherein an amount by which the second power consumption exceeds a predetermined threshold is supplied from the battery while the first and second switches are closed, and wherein the mating second connector receives the battery voltage from the first connector when the first and second connectors are connected.

9. The battery case of claim 8 wherein the electronic device is a cellular telephone and wherein the housing is configured to receive the cellular telephone.

10. The battery case of claim 9 wherein the battery has first and second battery cells coupled in series.

11. A battery case that is operable with an electronic device, comprising:
   a housing that is removably attached to the electronic device;
   a battery; and
   circuitry configured to:
      receive a sequence of power data objects;
      reorder the received sequence of power data objects; and
      provide the reordered sequence of power data objects to the electronic device.

12. The battery case of claim 11 wherein the circuitry is configured to add a power data object associated with the battery to the received sequence of power data objects.

13. A battery case that is operable in a system having a first electronic device and a second electronic device, wherein the first electronic device is configured to supply power, the battery case comprising:
   a housing that removably attaches to the second electronic device;
   circuitry having an input and an output and at least one signal line connected between the input and the output; and
   a battery, wherein the circuitry is configured to:
      supply a sequence of power data objects from the first electronic device to the second electronic device over the signal line;
      receive the sequence of power data objects from the second device;
      reorder the received sequence of power data objects; and
      provide the reordered sequence of power data objects to the second electronic device using the output.

14. The battery case of claim 13 wherein the circuitry is further configured to add a power data object to the received sequence of power data objects before reordering the sequence of power data objects.

15. The battery case of claim 14 wherein the added power data object characterizes a voltage and current available from the battery when supplying power to the second electronic device.

16. The battery case of claim 13, wherein the first electronic device has a first connector and the battery case has a second connector that mates with the first connector.

17. The battery case of claim 16 wherein the first electronic device comprises a power adapter configured to receive mains power.

18. A battery case that is operable in a system having a first electronic device and a second electronic device, comprising:
   a housing that removably attaches to the second electronic device;
   a battery; and
   circuitry that is configured to:
      supply power to the second electronic device from the first electronic device; and
      in response to determining that the second electronic device is drawing a current exceeding a threshold amount, supply power less than or equal to the threshold amount to the second electronic device from the first electronic device and supply power exceeding the threshold amount to the second electronic device from the battery without using a battery on the second electronic device to power operations on the second electronic device.

19. The battery case of claim 18 wherein the first electronic device comprises a cellular telephone and wherein the housing is configured to removably receive the cellular telephone.

20. The battery case of claim 19 wherein the cellular telephone is configured to draw the current exceeding a threshold current amount in response to activation of a voice-activated assistant on the cellular telephone and wherein the battery is at least partly used in supplying the current exceeding the threshold current amount.

* * * * *

UNITED STATES PATENT AND TRADEMARK OFFICE
CERTIFICATE OF CORRECTION

PATENT NO. : 11,303,138 B2
APPLICATION NO. : 16/443678
DATED : April 12, 2022
INVENTOR(S) : Lior Ben-Yehoshua et al.

It is certified that error appears in the above-identified patent and that said Letters Patent is hereby corrected as shown below:

In the Claims

Column 12, Line 19, "comprise a coil" should read -- comprises a coil --

Signed and Sealed this
Sixteenth Day of August, 2022

Katherine Kelly Vidal
*Director of the United States Patent and Trademark Office*